June 12, 1951    H. NISLE, SR    2,556,628
FISHING ALARM

Filed May 13, 1948    3 Sheets-Sheet 1

Harry Nisle, Sr.
INVENTOR.

BY *Clarence A. O'Brien*
and *Harvey B. Jacobson*
Attorneys

June 12, 1951  H. NISLE, SR  2,556,628
FISHING ALARM
Filed May 13, 1948  3 Sheets-Sheet 2

Harry Nisle, Sr.
INVENTOR.

June 12, 1951   H. NISLE, SR   2,556,628
FISHING ALARM

Filed May 13, 1948   3 Sheets-Sheet 3

Harry Nisle, Sr.
INVENTOR.

BY *Clarence A. O'Brien*
*and Harvey B. Jackson*
Attorneys

Patented June 12, 1951

2,556,628

UNITED STATES PATENT OFFICE 2,556,628

FISHING ALARM

Harry Nisle, Sr., Chicago, Ill.

Application May 13, 1948, Serial No. 26,847

3 Claims. (Cl. 43—17)

This invention relates to new and useful improvements in fishing devices and the primary object of the present invention is to provide a fishing alarm including a visual signal and a sound signal which may be individually or simultaneously actuated by a fish or such other water creature, to indicate to a fisherman that his line has been engaged by a fish or the like at night or during times when visibility is poor.

Another important object of the present invention is to provide a fishing alarm applicable for both day and night fishing that includes a novel and improved pressure actuated switch which may be quickly and readily adjusted to vary the amount of pressure necessary for activating the same.

A further object of the present invention is to provide an electrically operated fishing alarm including a lamp that is conveniently energized by a battery carried by the alarm for use of the same in stringing a line, net or the like and which may be employed as an auxiliary light such as a flashlight, warning light or safety light.

A still further aim of the present invention is to provide a signal alarm for fishermen and the like that is simple and practical in construction, small and compact in structure, strong and reliable in use, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
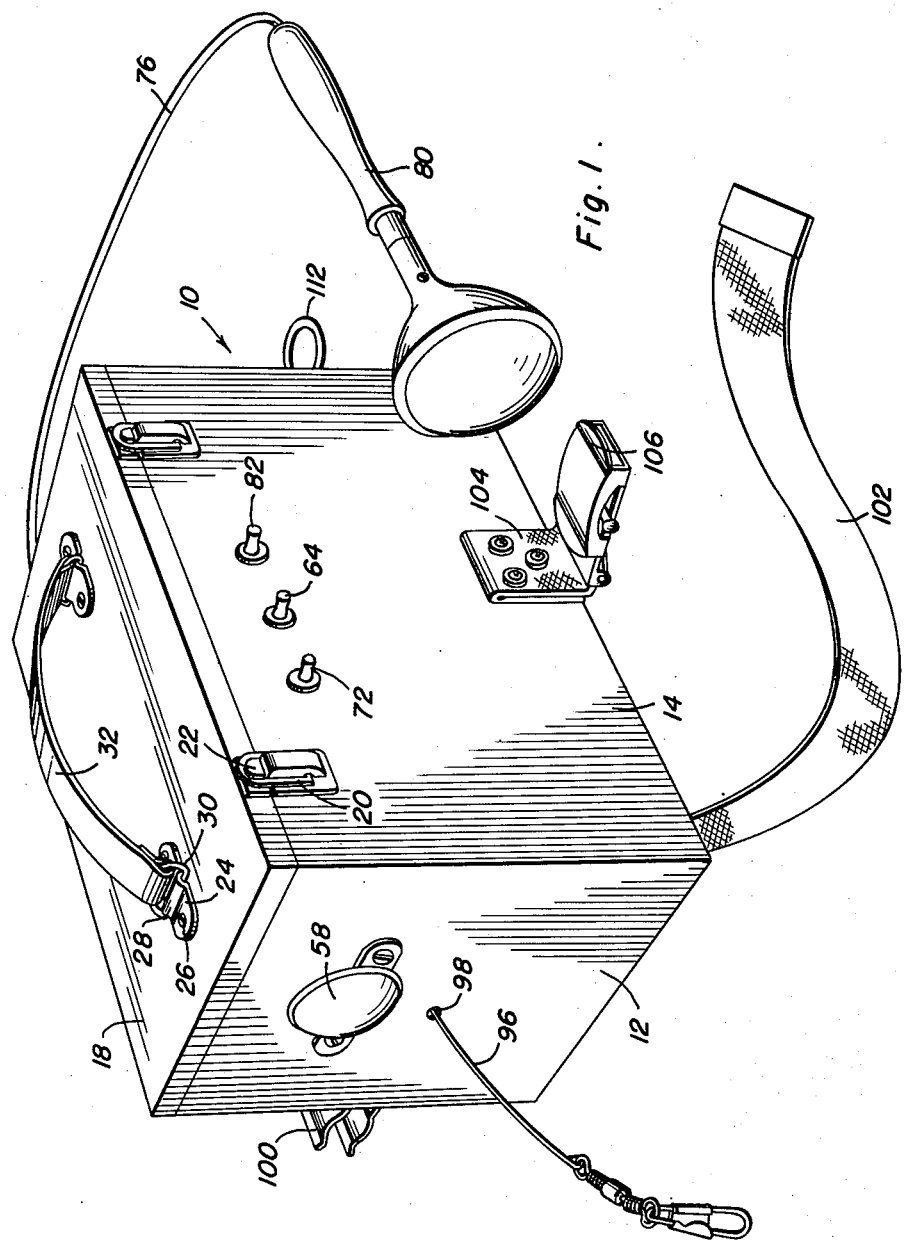
Figure 1 is a perspective view of the fishing alarm constructed in accordance with the present invention, and with the lamp removed from its supporting clip.
Figures 2, 3:
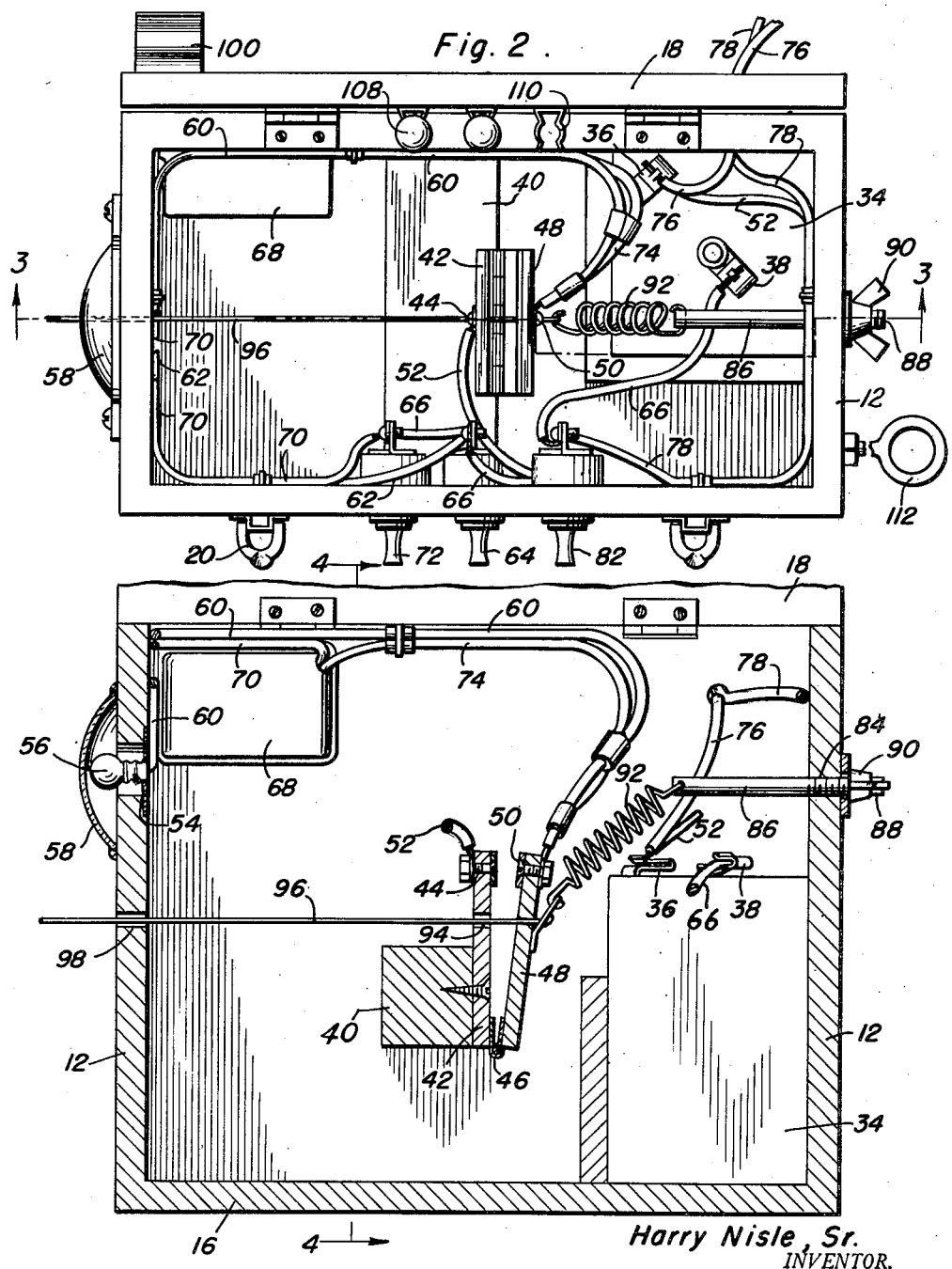
Figure 2 is a top plan view of the present fishing alarm showing the cover in a raised position, and with the circuit wire for the lamp shown in part.
Figure 3 is a longitudinal vertical sectional view of the present fishing alarm taken substantially on the plane of broken section line 3—3 of Figure 2.
Figure 4:
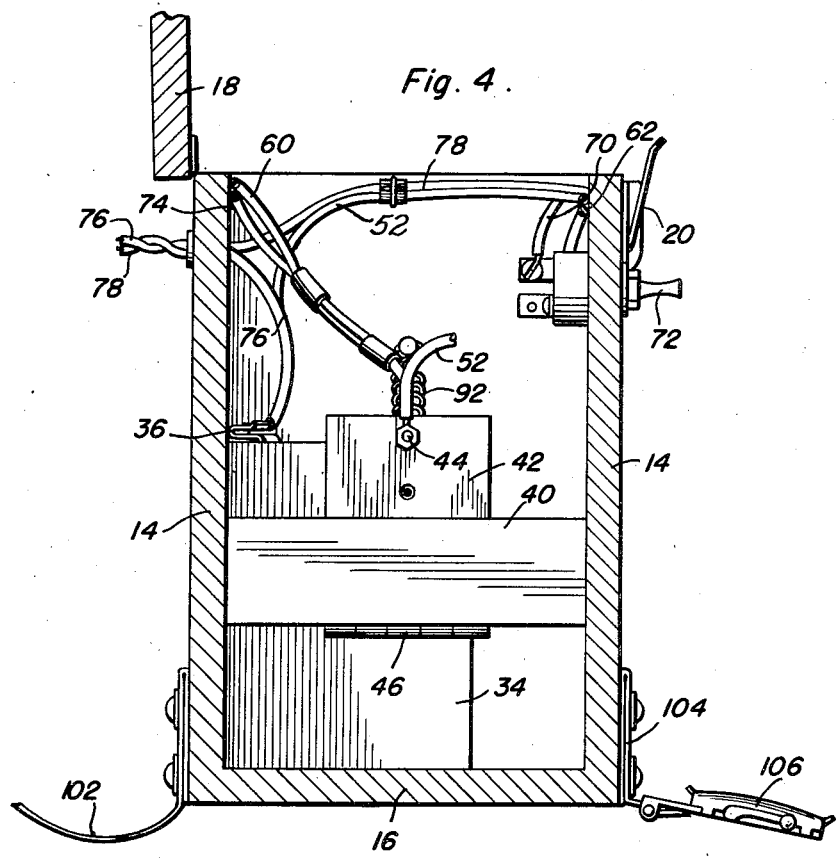
Figure 4 is a transverse vertical sectional view of the present fishing alarm taken substantially on the plane of section line 4—4 of Figure 3.
Figure 5:
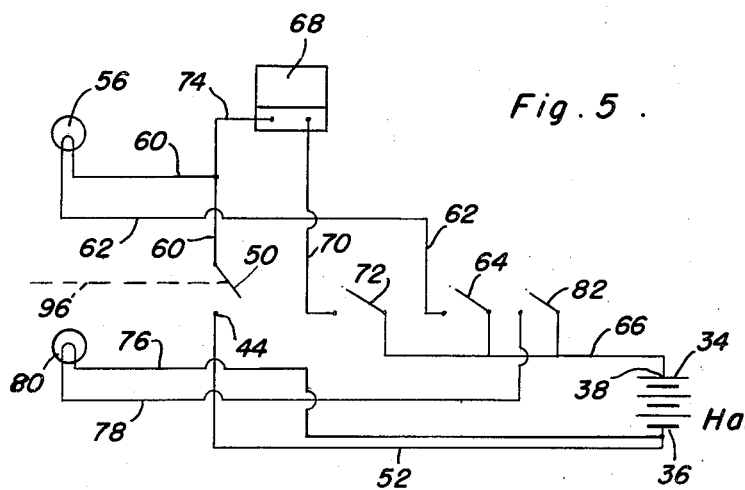
Figure 5 is a schematic diagram illustrating the electrical system used in conjunction with the present invention.

Referring now to the drawings in detail, wherein for the purpose of illustration, there is disclosed a preferred embodiment of the present invention, the numeral 10 represents a substantially rectangular housing or casing generally of any suitable material including end walls 12, side walls 14, a bottom wall 16 and a hinged upper wall 18.

Locking latches 20 carried by one of the side walls 14 are engageable with lugs 22 carried by the hinged upper wall 18 for retaining the upper wall in a closed position as shown best in Figure 1 of the drawings.

The upper wall 18 is also provided with a pair of holding brackets or anchor plates 24 which are removably secured to the upper wall 18 by fasteners or the like 26. These brackets 24 include depressions 28 that engage loops 30 at the ends of a handle or strap 32.

Suitably fixed within the housing 10, is a suitable battery 34 having a pair of terminals 36 and 38. This battery 34 is spaced relative to a rigid support 40 that is suitably secured to the side walls 14 and to which there is removably secured a fixed holding plate 42 having a conductive element or contact 44. Hinged as at 46 to the plate 42, is a movable holding plate 48 having a movable conductive element or contact 50 that cooperates with the contact 44 and which is connected by a wire 52 to the terminal 36.

Removably secured to one of the end walls 12 of the housing 10, is a lamp socket 54 that supports a bulb 56. The socket 54 and bulb 56 register with a translucent guard or shield 58 of preferably amber material although any other suitable color may be employed. The bulb 56 is connected to the contact 50 by a conductive wire 60, and a further conductive wire 62 connected to the bulb 56 extends to a preferably pull type switch 64 mounted on one side wall 14 of the housing 10 that is connected to the terminal 38 of the battery 34 by a conductive wire 66.

Removably secured to one of the side walls 14 is an electrical buzzer or sound alarm 68 one terminal of which is connected by a conductive wire 70 to a further pull type switch 72 carried by the housing adjacent the switch 64. The remaining terminal of the sound alarm or signal 68 is connected by a conductive wire 74 to the contact 50 or to the wire 60.

Extending outwardly from a suitable aperture provided in one of the side walls 14, is a pair of conductive wires 76 and 78 which are connected to a suitable lamp or light 80. One of these wires, for example wire 76 is connected to the wire 52 or directly to the terminal 36 of the battery 34, and the remaining of the wires, namely, wire 78 is connected to a still further pull type switch 82 carried by the housing adjacent the switch 64. It should be noted, that the switches 72 and 82 are also connected to the terminal 38 or to a further conductive wire leading from the terminal 38 of the battery 34.

Projecting outwardly from an opening 84 provided in one end wall 12, is an adjusting rod 86 one end 88 of which is externally threaded to receivably engage a wing nut or the like 90. The inner end of the rod 86 is anchored to one end of a coil spring 92 that is fixed to the movable holding plate 48 to normally retain the holding plate 48 spaced relative to the holding plate 42.

The plate 42 is formed with an aperture 94 that slidably receives an actuating line or cord 96 that is anchored to the movable holding plate 48 and which extends outwardly through an aperture 98 provided in one end wall 12.

Fixed on one side wall 14 of the housing 10 in a conveniently accessible position, is a spring clip 100 that will engage and support the lamp 80.

Rigidly attached to the side walls 14, are a pair of straps 102 and 104, one of which supports a buckle 106 that adjustably receives the remaining strap whereby the present housing may be conveniently supported by the shoulder of a user or whereby the present invention may be strapped about a boat seat to prevent a fish from pulling the same into the water.

In practical use of the present invention, the switch 64 may be manually actuated to an "on" position so that when a pressure is applied on the line 96 the switch or movable plate 48 will be actuated to complete a circuit to the light bulb 56.

The sound signal 68 may be simultaneously actuated with the bulb 56 by turning the switch 72 to an "on" position together with the switch 64. However, the same may be actuated independently by turning the switch 64 to an "off" position.

The lamp 80 is not actuated by the movement of the holding plate 48, but may be activated by moving the switch 82 to an "on" position to complete a circuit between the battery 34 and the lamp 80.

Obviously, the switches 64, 72 and 82 may be actuated to an "on" position together so that both the sound alarm and visual alarm may be actuated when a pressure is applied to the line 96 and the lamp 80 will be energized and illuminated.

Auxiliary bulbs 108 are supported in spring clips 110 carried by the inner face of the cover or wall 18, and a swivel 112 is mounted on one end wall to facilitate an anchor line to be applied thereto thus preventing the housing from being pulled into the water by a fish or the like.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A fishing alarm comprising a housing, an electrical sound signal carried by said housing, a battery mounted in said housing, a circuit connecting the battery to the sound signal, an electrically activated visual signal, a further circuit connecting the visual signal to the battery, a switch for each of said circuits, a master pressure actuated switch including first and second contact holding plates controlling both of said circuits, a support within the housing and supporting the first holding plate, a hinge connecting said holding plates, a spring connecting the second holding plate to the housing for urging the holding plates apart, and a line slidably carried by the housing and by the first holding plate and connected to the second holding plate.

2. A fishing alarm comprising a housing including a first and second pair of spaced walls, an electrical signal carried by the housing, a battery mounted in said housing, a circuit connecting the battery to the signal, a support mounted in the housing between said second pair of walls, a switch mounted on the support and controlling the circuit, said switch including first and second contact holding plates, said first holding plate being secured to said support, a hinge connecting the holding plates, one of said first pair of walls and said first holding plate having registering openings, a line slidably received in said openings and connected to said second holding plate, and means yieldingly securing the second holding plate to the other of said first pair of walls for urging the second holding plate away from the first holding plate.

3. The combination of claim 2 wherein said means includes a rod having inner and outer end portions, the other of said first pair of walls having an aperture receiving the outer end portion of said rod, a nut threaded on the outer end portion of said rod, and an elongated spring member terminally secured to said second holding plate and the inner end portion of said rod.

HARRY NISLE, Sr.

REFERENCES CITED

The following references are of record in the file of this patent:

UNITED STATES PATENTS

| Number | Name | Date |
| --- | --- | --- |
| 522,352 | Poppowitsch | July 3, 1894 |
| 1,220,617 | Evans | Mar. 27, 1917 |
| 1,388,187 | Marble | Aug. 23, 1921 |
| 1,737,921 | Derr | Dec. 3, 1929 |
| 2,115,027 | Leonard | Apr. 26, 1938 |
| 2,170,000 | Eggleston | Aug. 22, 1939 |
| 2,195,692 | Bushey | Apr. 2, 1940 |
| 2,302,337 | Mantell | Nov. 17, 1942 |
| 2,446,427 | Linder | Aug. 3, 1948 |

FOREIGN PATENTS

| Number | Country | Date |
| --- | --- | --- |
| 37,681 | Norway | Aug. 20, 1923 |
| 592,549 | Germany | Feb. 8, 1934 |